(12) United States Patent
Lin et al.

(10) Patent No.: US 11,348,261 B2
(45) Date of Patent: May 31, 2022

(54) METHOD FOR PROCESSING THREE-DIMENSIONAL POINT CLOUD DATA (71) Applicant: National Yunlin University of Science and Technology, Yunlin (TW)

(72) Inventors: Chien-Chou Lin, Kaohsiung (TW); Kuan-Chi Lin, Taipei (TW)

(73) Assignee: NATIONAL YUNLIN UNIVERSITY OF SCIENCE AND TECHNOLOGY, Yunlin (TW)

( * ) Notice: Subject to any disclaimer, the term of this patent is extended or adjusted under 35 U.S.C. 154(b) by 182 days.

(21) Appl. No.: 16/854,744

(22) Filed: Apr. 21, 2020

(65) Prior Publication Data
US 2021/0272301 A1 Sep. 2, 2021

(30) Foreign Application Priority Data
Mar. 2, 2020 (TW) ................. 109106746

(51) Int. Cl.
*G06T 7/521* (2017.01)
*G01S 17/42* (2006.01)
*G06V 20/58* (2022.01)
*G01S 17/89* (2020.01)

(52) U.S. Cl.
CPC ............. *G06T 7/521* (2017.01); *G01S 17/42* (2013.01); *G01S 17/89* (2013.01); *G06T 2207/10024* (2013.01); *G06T 2207/10028* (2013.01); *G06T 2207/20021* (2013.01); *G06V 20/58* (2022.01)

(58) Field of Classification Search
CPC .......... G06N 3/0454; G06N 3/08; G06N 3/04; G06N 20/00; G06N 3/02; G06N 7/046; G06T 2207/20081; G06T 2207/20084; G06T 7/11; G06T 2207/10028; G06T 17/00; G06T 7/73; G06T 2200/04; G06T 19/00; G06T 15/08; G06T 7/75; G06T 11/008; G06T 7/70; G06T 7/50; G06T 2207/30252; G06T 19/006; G06T 7/174; G06T 2207/30261; G06T 2219/004; G06T 7/521; G06T 2207/20021; G06T 17/005; G06T 7/00; G06T 2207/20108; G06T 3/4046; G06T 2207/30256; G06T 9/002; G06T 15/00; G06T 17/30; G06K 9/00201; G06K 9/6256; G06K 9/4628; G06K 9/6267; G06K 9/627; G06K 9/4604; G06K 9/6271; G06K 9/00791; G06K 9/00805; G06K 9/629; G06K 9/00798; G06F 30/27; G06F 30/20
See application file for complete search history.

(56) References Cited

U.S. PATENT DOCUMENTS

2021/0049397 A1* 2/2021 Chen ................ G06N 3/084
2021/0213973 A1* 7/2021 Carillo Pena ............ G06T 7/70

* cited by examiner

Primary Examiner — Xiao M Wu
Assistant Examiner — Scott E Sonners
(74) Attorney, Agent, or Firm — Sinorica LLC (57) ABSTRACT A method for processing three-dimensional point cloud data includes a data creation step, a layering step, a gridding step, a data processing step and a two-dimensional image generation step, so that the three-dimensional point cloud data can be converted into a two-dimensional image, and the two-dimensional image can correspond to, identify and store the axial depth and information point features of the point cloud data in three axes.

8 Claims, 12 Drawing Sheets

| the number of information points | 6 | 11 | 13 | 16 | 10 | 25 | 23 |
|---|---|---|---|---|---|---|---|
| grid value | 61 | 112 | 132 | 163 | 102 | 255 | 235 |

| the number of information points | 13 | 23 | 6 | 10 | 3 | 9 | 3 |
|---|---|---|---|---|---|---|---|
| grid value | 133 | 235 | 61 | 102 | 31 | 92 | 31 |

|  | without coordinate transformation ||||  with coordinate transformation ||||
|  | object | accuracy rate | recall rate | comprehensive evaluation index | object | accuracy rate | recall rate | comprehensive evaluation index |
| without information point supplementation | vehicle | 86.36% | 76.00% | 80.85% | vehicle | 91.49% | 86.00% | 88.66% |
|  | person | 63.93% | 78.00% | 70.27% | person | 68.33% | 82.00% | 74.55% |
|  | other | 53.33% | 48.00% | 50.53% | other | 72.09% | 62.00% | 66.67% |
|  | average | 67.88% | 67.33% | 67.22% | average | 77.31% | 76.67% | 76.62% |
| with information point supplementation | vehicle | 84.31% | 86.00% | 85.15% | vehicle | 93.48% | 86.00% | 89.58% |
|  | person | 67.69% | 88.00% | 76.52% | person | 69.23% | 90.00% | 78.26% |
|  | other | 67.65% | 46.00% | 54.76% | other | 74.36% | 58.00% | 65.17% |
|  | average | 73.22% | 73.33% | 72.14% | average | 79.02% | 78.00% | 77.67% |

FIG. 19

|  | without coordinate transformation | | | | with coordinate transformation | | | |
|---|---|---|---|---|---|---|---|---|
|  | object | accuracy rate | recall rate | comprehensive evaluation index | object | accuracy rate | recall rate | comprehensive evaluation index |
| without information point supplementation | vehicle | 93.02% | 80.00% | 86.02% | vehicle | 92.31% | 96.00% | 94.12% |
|  | person | 58.00% | 58.00% | 58.00% | person | 79.25% | 84.00% | 81.55% |
|  | other | 56.14% | 64.00% | 59.81% | other | 82.22% | 74.00% | 77.89% |
|  | average | 69.05% | 67.33% | 67.94% | average | 84.59% | 84.67% | 84.52% |
| with information point supplementation | vehicle | 87.04% | 94.00% | 90.38% | vehicle | 93.75% | 90.00% | 91.84% |
|  | person | 70.00% | 70.00% | 70.00% | person | 82.35% | 84.00% | 83.17% |
|  | other | 60.87% | 56.00% | 58.33% | other | 74.51% | 76.00% | 75.25% |
|  | average | 72.64% | 73.33% | 72.91% | average | 83.54% | 83.33% | 83.42% |

FIG. 20

METHOD FOR PROCESSING THREE-DIMENSIONAL POINT CLOUD DATA

FIELD OF THE INVENTION

The present invention relates to three-dimensional point cloud data, and more particularly to a method for processing three-dimensional point cloud data.

BACKGROUND OF THE INVENTION

In recent years, there are more and more related researches on self-driving cars for judging pedestrians and vehicles. In general, self-driving cars use Light Detection and Ranging (LiDar) sensors to obtain information around the cars. Therefore, three-dimensional object recognition technology has become the main research for self-driving cars. LiDar is used to obtain the outline of an object. The obtained contour is the contour of the object viewed by the LiDar, not a complete object model. If data processing is performed only for a certain dimension, it may reduce the three-dimensional information of point cloud data, further reducing the accuracy of model training and testing. For maintaining the basic information of a three-dimensional object, the contour characteristics of the LiDar should be considered so that the characteristics of the three-dimensional object can be kept through the calculation of three-dimensionality. The neural network technology for image judgment is approaching maturity. However, the three-dimensional object recognition technology converts three-dimensional data to two-dimensional data for identification. In the conversion process, depth information may be lost, which may cause inaccurate identification results. For example, Convolutional Neural Network (CNN) has excellent performance in identifying images. However, according to the architecture of the convolutional neural network, the input model must be two-dimensional data. The three-dimensional point cloud data cannot be directly input into the architecture of the convolutional neural network for identification. The three-dimensional point cloud data must be compressed into two dimensional data before being processed. However, if the three-dimensional point cloud data is compressed and converted into two-dimensional data, the information points and depth may be lost, which is the main problem encountered in the three-dimensional point cloud identification.

Accordingly, the inventor of the present invention has devoted himself based on his many years of practical experiences to solve these problems.

SUMMARY OF THE INVENTION

The primary object of the present invention is to provide a method for processing three-dimensional point cloud data. When the three-dimensional point cloud data is converted into two-dimensional data, the axial depth of the point cloud data in three axes can be identified.

In order to achieve the aforesaid object, the present invention provides a method for processing three-dimensional point cloud data, comprising a data creation step, creating a three-dimensional coordinate and corresponding point cloud data to the three-dimensional coordinate, the three-dimensional coordinate having three axes, the point cloud data having a plurality of information points, the information points including a plurality of general information points, a space where the information points are located forming a data block at the three-dimensional coordinate; a layering step, dividing the data block into a plurality of data layers arranged in order along at least one of the axes, through the layering step, axial depths of the point cloud data and the data layers being identifiable.

The method for processing three-dimensional point cloud data provided by the present invention can identify the axial depth of the point cloud data in three axes through the data creation step and the layering step.

DETAILED DESCRIPTION OF THE PREFERRED EMBODIMENTS

Embodiments of the present invention will now be described, by way of example only, with reference to the accompanying drawings.

Referring to FIG. 1 through FIG. 12, a method for processing three-dimensional point cloud data according to a first embodiment of the present invention comprises a data creation step S1, a layering step S2, a gridding step S3, a data processing step S4, and a two-dimensional image generation step S5.

Figure 1:
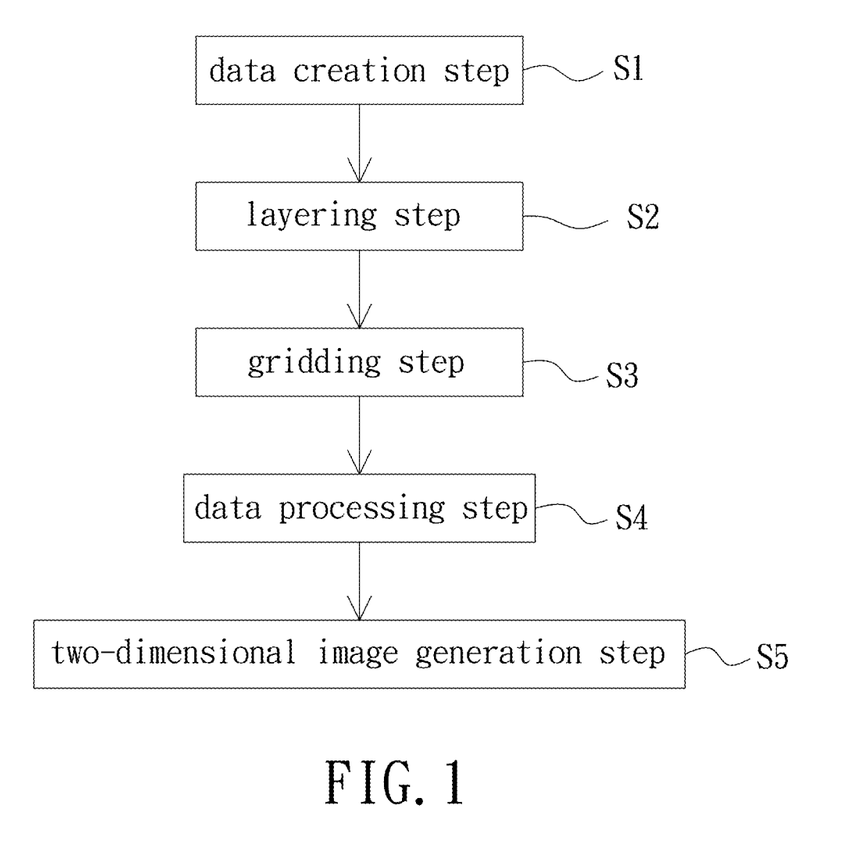
FIG. 1 is a flow chart of the present invention.
Figure 2:
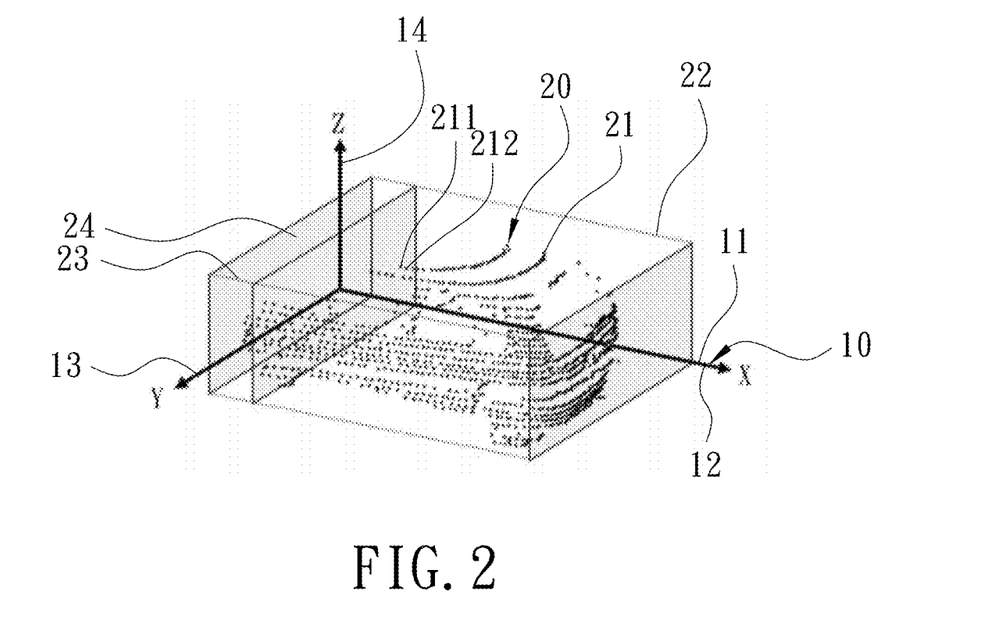
FIG. 2 is a schematic view of the data creation step and the layering step of the data block along the X axis according to a first embodiment of the present invention when in use.

In the data creation step S1, referring to FIG. 1 and FIG. 2 that show the status of the data creation step S1, a three-dimensional coordinate 10 is created and point cloud data 20 corresponds to the three-dimensional coordinate 10. The three-dimensional coordinate 10 has three axes 11. The three axes 11 are defined as an X-axis 12, a Y-axis 13 and a Z-axis 14. The point cloud data 20 can be rotated and displaced at the three-dimensional coordinate 10. The point cloud data 20 has a plurality of information points 21. The information points 21 include a plurality of general information points 211 and a plurality of supplementary information points 212. Each supplementary information point 212 is interposed between every adjacent two of the general information points 211, so that the space where the information points 21 are located forms a data block 22 at the three-dimensional coordinate 10. The information points 21 are distributed in the data block 22.

Figure 3:
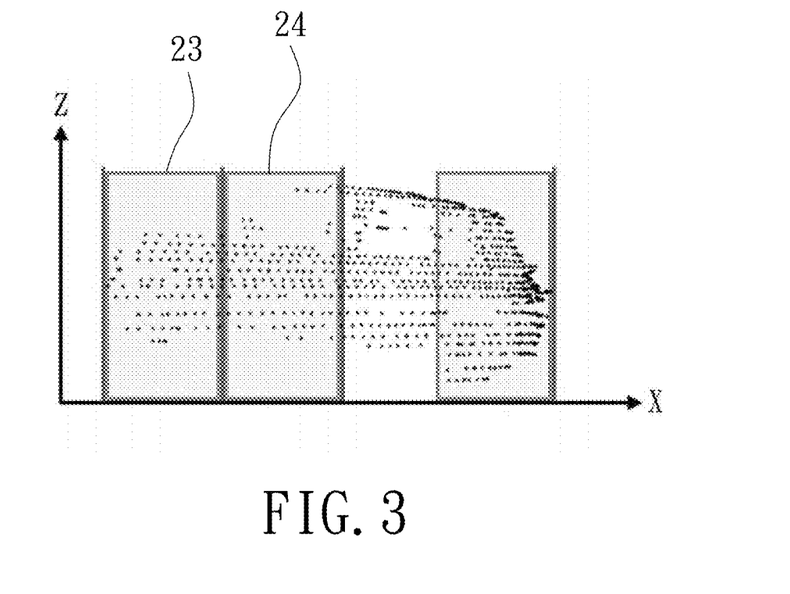
FIG. 3 is a schematic view of the layering step of the data block along the X axis according to the first embodiment of the present invention when in use.
Figure 4:
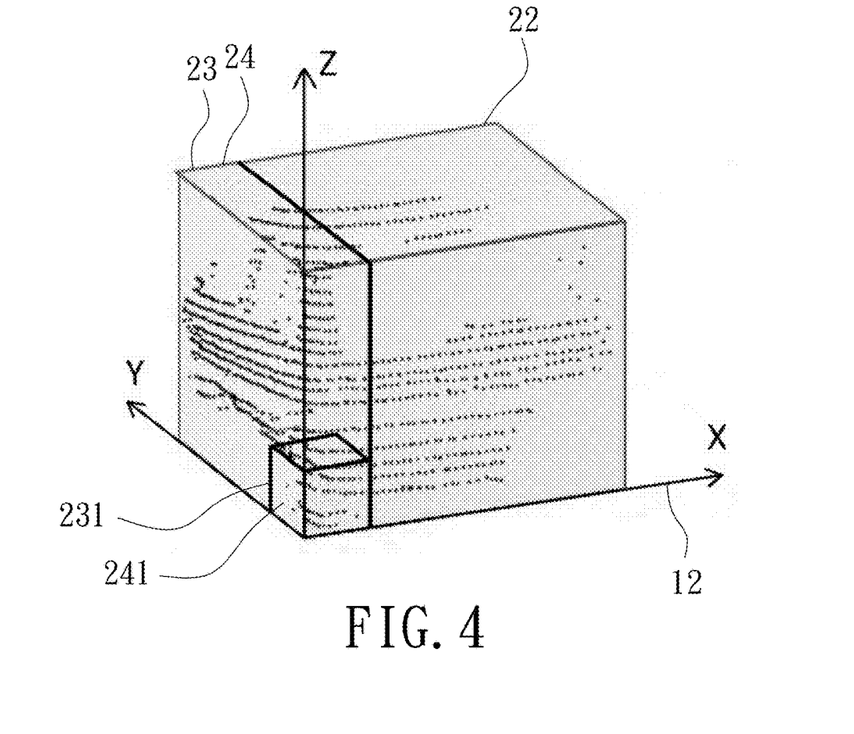
FIG. 4 is a schematic view of the layering step of the data block along the X axis according to the first embodiment of the present invention when in use.
Figure 5:
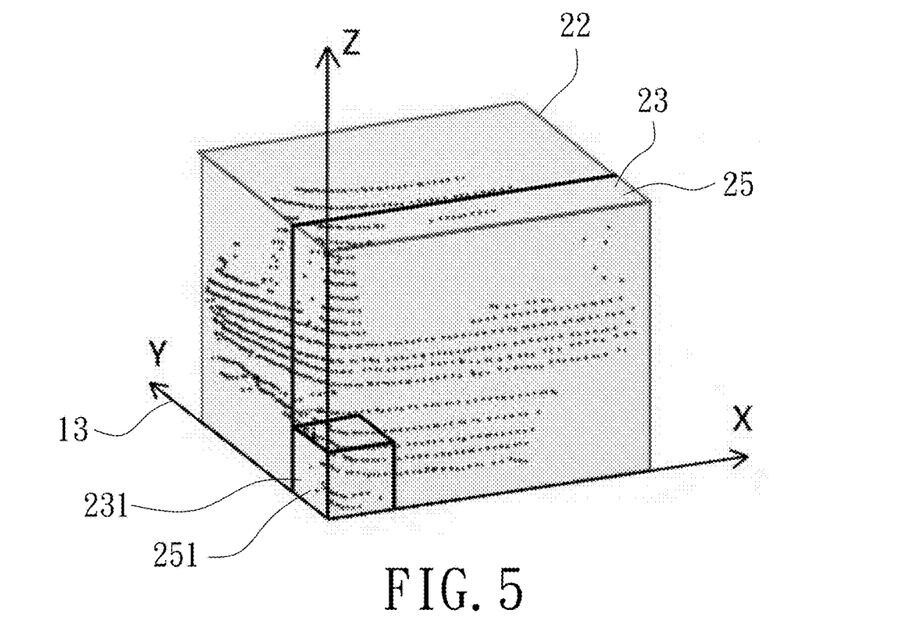
FIG. 5 is a schematic view of the layering step of the data block along the Y axis according to the first embodiment of the present invention when in use.
Figure 6:
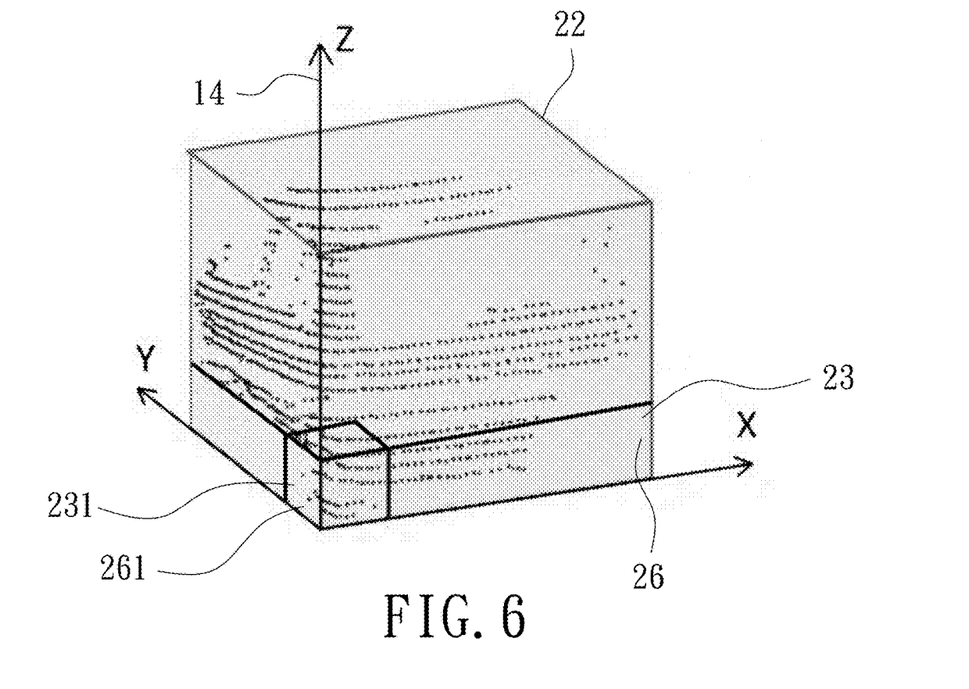
FIG. 6 is a schematic view of the layering step of the data block along the Z axis according to the first embodiment of the present invention when in use.

In the layering step S2, referring to FIG. 2 through FIG. 6, the data block 22 is divided into a plurality of data layers 23 arranged in order along at least one of the axes 11. Through the layering step S2 and the data layers 23, the axial depths of the point cloud data 20 and the data layers 23 can be identified. Wherein, in the first embodiment of the present invention, the data block 22 is divided into the plurality of data layers 23 along the X-axis 12, the Y-axis 13 and the Z-axis 14, respectively. The data layers 23 of the data block 22, divided along the X-axis 12, are defined as X-axis data layers 24. The data layers 23 of the data block 22, divided along the Y-axis 13, are defined as Y-axis data layers 25. The data layers 23 of the data block 22, divided along the Z-axis 14, are defined as Z-axis data layers 26. FIGS. 2 to 6 illustrate the layering step S2. FIG. 2 and FIG. 3 only illustrate that the data block 22 is sequentially divided along the X-axis 12 into the plurality of X-axis data layers 24, and the plurality of data layers 23 of the data block 22, divided along the Y-axis 13 and the Z-axis 14, are omitted in the figures. FIGS. 4 to 6 only illustrate that the data block 22 is divided into a single data layer 23 along the respective axes 11, and the plurality of data layers 23 of the data block 22, divided along the respective axes 11, are omitted in the figures.

Figure 7:
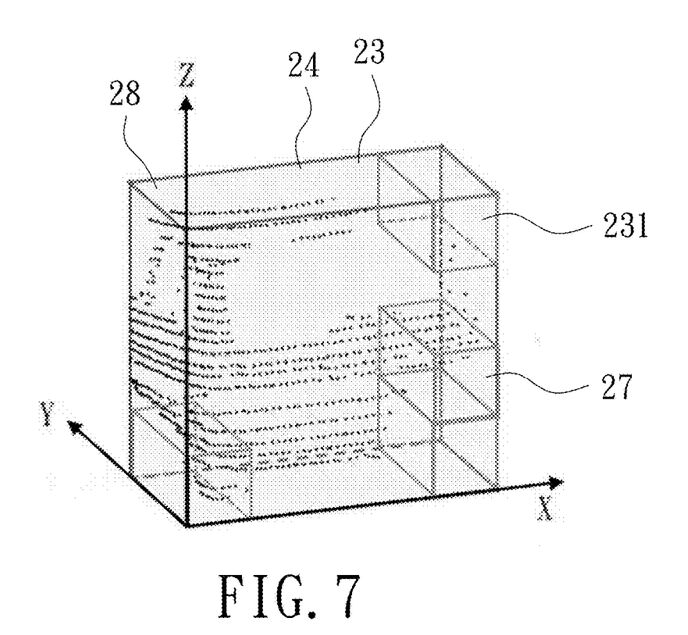
FIG. 7 is a schematic view of the gridding step of the Y-axis data layer according to the first embodiment of the present invention when in use.

In the gridding step S3, each data layer 23 is gridded into a plurality of grids 231. FIG. 7 only illustrates that a single Y-axis data layer 25 is partially gridded, and the grids of other data layers 23 are omitted in the figure.

Figure 8:
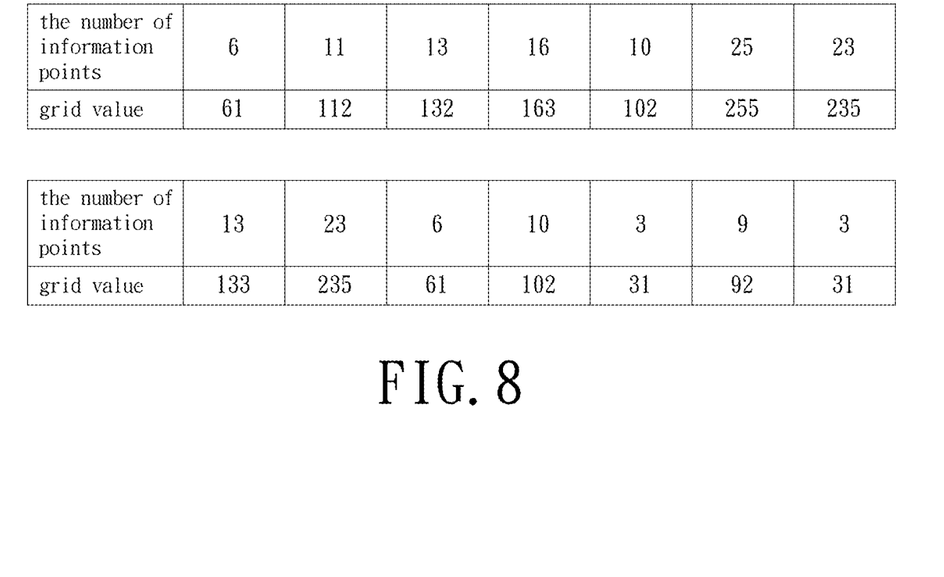
FIG. 8 is a schematic view of the data processing step according to the first embodiment of the present invention when in use.

In the data processing step S4, the number of information points 21 included in each grid 231 is calculated, and the number of information points 21 in each grid 231 is converted into a grid value according to a conversion rule. Wherein, in the first embodiment of the present invention, the grid value is in the range of 0 to 255. The conversion rule can scale the minimum value to the maximum value of the number of information points 21 in each grid 231 to the grid value in the range of 0 to 255. Wherein, when the grid value of each grid 231 is calculated, the grid 231 is defined as a target grid 27. The grid value of the target grid 27 is defined as a target grid value. The data layer 23 where the target grid 27 is located is defined as a target data layer 28. The conversion rule is represented by the following Mathematical Formula 1, $V_{target}=(N_{target}/N_{max})*255$ . . . Formula (1). Wherein, $V_{target}$ is the target grid value, and $N_{target}$ is the number of information points 21 of the target grid 27, and $N_{max}$ is the maximum value of the number of information points 21 in all of the grids 231 of the target data layer 28. The target grid value is rounded. FIG. 8 illustrates an example that the number of information points 21 is converted into the grid value according to the conversion rule. For example, the maximum value of the number of information points 21 in the grid 231 of the target data layer 28 is 25. The number of information points 21 in the target grid 27 is 6, and after conversion by the conversion rule, the target grid value is 61.

In the two-dimensional image generation step S5, referring to FIGS. 9 to 12 that illustrate the status of 2D image generation, a two-dimensional pixel layer 40 is set. The two-dimensional pixel layer 40 is composed of a plurality of pixels 41. Each pixel 41 has a pixel value. The pixels 41 and the pixel values of the two-dimensional pixel layer 40 correspond to the grids 231 and the grid values of each data layer 23 of the at least one axis 11 for the two-dimensional pixel layer 40 to generate a two-dimensional image. In the first embodiment of the present invention, the two-dimensional pixel layer 40 is a two-dimensional grayscale layer 42. The pixels 41 of the two-dimensional grayscale layer 42 are grayscale pixels, and the pixel values of the pixels 41 of the two-dimensional grayscale layer 42 are grayscale values. The two-dimensional grayscale layer 42 is provided with an X-axis pixel area 421 corresponding to each X-axis data layer 24. The pixels 4211 and the pixel values of the X-axis pixel areas 421 correspond to the grids 241 and the grid values of the X-axis data layers 24. The two-dimensional grayscale layer 42 is provided with a Y-axis pixel area 422 corresponding to each Y-axis data layer 25. The pixels 4221 and the pixel values of the Y-axis pixel areas 422 correspond to the grids 251 and the grid values of the Y-axis data layers 25. The two-dimensional grayscale layer 42 is provided with a Z-axis pixel area 423 corresponding to each Z-axis data layer 26. The pixels 4231 and the pixel values of the Z-axis pixel areas 423 correspond to the grids 261 and the grid values of the Z-axis data layers 26, so that the two-dimensional grayscale layer 42 generates a two-dimensional grayscale image 200, and the two-dimensional pixel layer 40 and the two-dimensional grayscale image 200 correspond to and store information point features and depth information of the point cloud data 20 in the three axes.

In the first embodiment of the present invention, for a clear explanation, this paragraph only takes the Y-axis data layer 25 of the data block 22 of the point cloud data 20 as an example. Because the process is the same, the illustration and description of the X-axis data layer and the Z-axis data layer are omitted. Referring to FIG. 5 and FIG. 7 through FIG. 10, after the point cloud data 20 is completed according to the data creation step S1, in the layering step S2, the data block 22 of the point cloud data 20 is divided into a plurality of Y-axis data layers 25 along the Y-axis 13 for identifying the depth information of the point cloud data 20 on the Y-axis 13. After that, in the gridding step S3, the Y-axis data layers 25 are divided into a plurality of grids 231, respectively. Through the data processing step S4, the number of information points 21 of the grids 251 of each Y-axis data layer 25 is calculated. The number of information points 21 of the grids 251 of each Y-axis data layer 25 is converted into grid values according to the conversion rule, as shown in FIG. 7 and FIG. 8.

Figure 9:
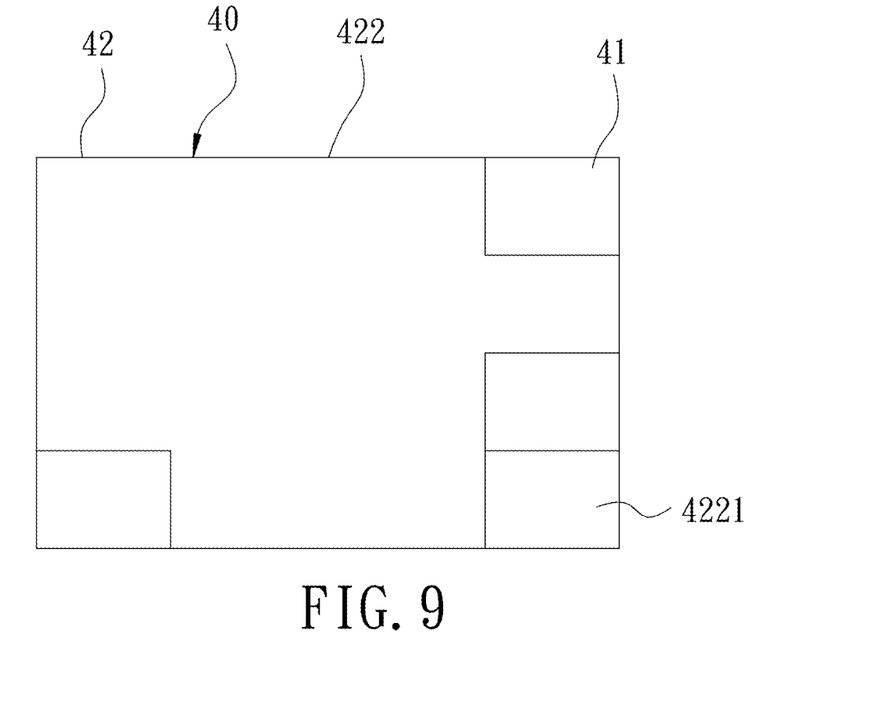
FIG. 9 is a schematic view of a single Y-axis pixel area corresponding to a single Y-axis data layer in the two-dimensional image generation step according to the first embodiment of the present invention when in use.

For a clear explanation, in this paragraph, the two-dimensional grayscale layer 42 is provided with the Y-axis pixel area 422 corresponding to a single Y-axis data layer 25, as an example. Because the process is the same, the illustration and description of the X-axis data layer and the Z-axis data layer are omitted. The pixels 4221 and the pixel values of the Y-axis pixel area 422 correspond to the grids 251 and the grid values of the Y-axis data layer 25, as shown in FIG. 7 and FIG. 9. FIG. 9 shows that a single Y-axis pixel area 422 corresponds to a single Y-axis data layer 25.

Figure 10:
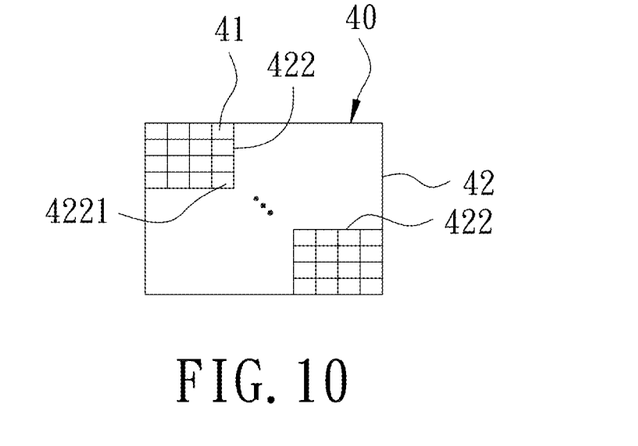
FIG. 10 is a schematic view of the two-dimensional grayscale layer corresponding to the Y-axis data layers in the two-dimensional image generation step according to the first embodiment of the present invention when in use.

For a clear explanation, in this paragraph, the two-dimensional grayscale layer 42 is provided with the Y-axis pixel areas 422 corresponding to the Y-axis data layers 25, as an example. Because the process is the same, the illustration and description of the X-axis data layer and the Z-axis data layer are omitted. When the two-dimensional grayscale layer 42 is provided with the Y-axis pixel area 422 corresponding to each Y-axis data layer 25, the pixels 4221 and the pixel values of the Y-axis pixel areas 422 correspond to the grids 251 and the grid values of the Y-axis data layers 25, and the two-dimensional grayscale layer 42 corresponds to the axial depth information of the Y-axis data layer 25 of the point cloud data 20 and the information point features of the grids 251, as shown in FIG. 10.

Figure 11:
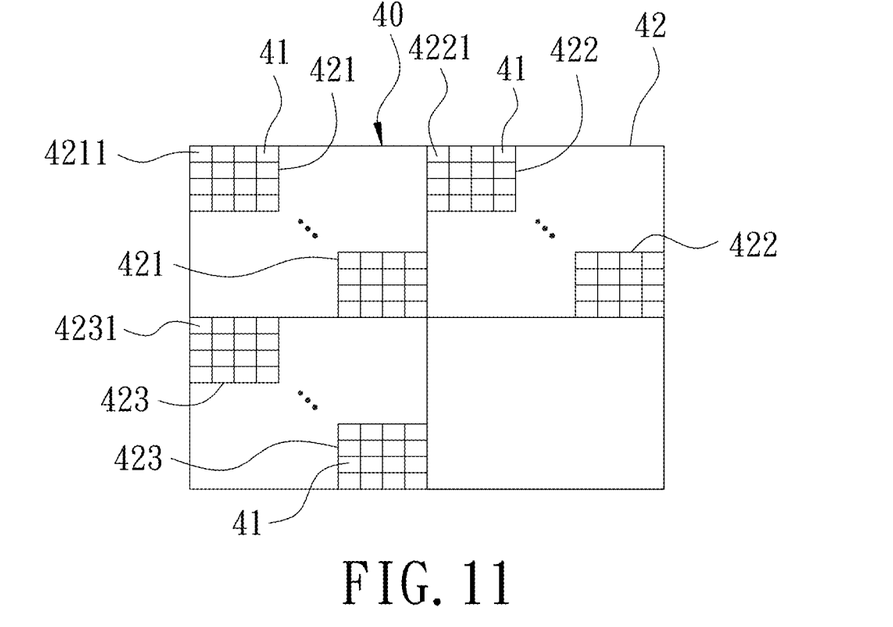
FIG. 11 is a schematic view of the two-dimensional grayscale layer corresponding to the data layer of the point cloud data in the two-dimensional image generation step according to the first embodiment of the present invention when in use.
Figure 12:
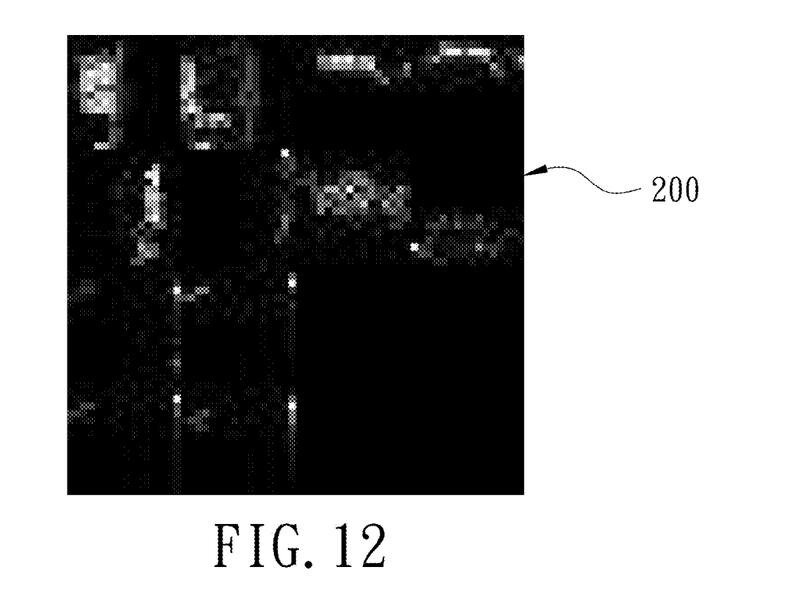
FIG. 12 is a schematic view of generating the two-dimensional grayscale image in the two-dimensional image generation step according to the first embodiment of the present invention when in use.

Referring to FIG. 11, when the two-dimensional grayscale layer 42 is provided with the X-axis pixel area 421 corresponding to each X-axis data layer 24 and when the two-dimensional grayscale layer 42 is provided with the Z-axis pixel area 423 corresponding to each Z-axis data layer 26, the subsequent process is the same as the aforementioned steps, and the description thereof is omitted in this paragraph. The pixels 41 and the pixel values of the X-axis pixel area 421, the Y-axis pixel area 422 and the Z-axis pixel area 423 of the two-dimensional grayscale layer 42 correspond to the grids 231 and the grid values of the X-axis data layers 24, the Y-axis data layers 25 and the Z-axis data layers 26, thereby enabling the two-dimensional grayscale layer 42 to generate a two-dimensional grayscale image 200. As shown in FIG. 12, the two-dimensional pixel layer 40 and the two-dimensional grayscale image 200 correspond to, identify and store the axial depth information and information point features of the point cloud data 20 in the three axes for identification by the architecture of the convolutional neural network.

Figure 13:
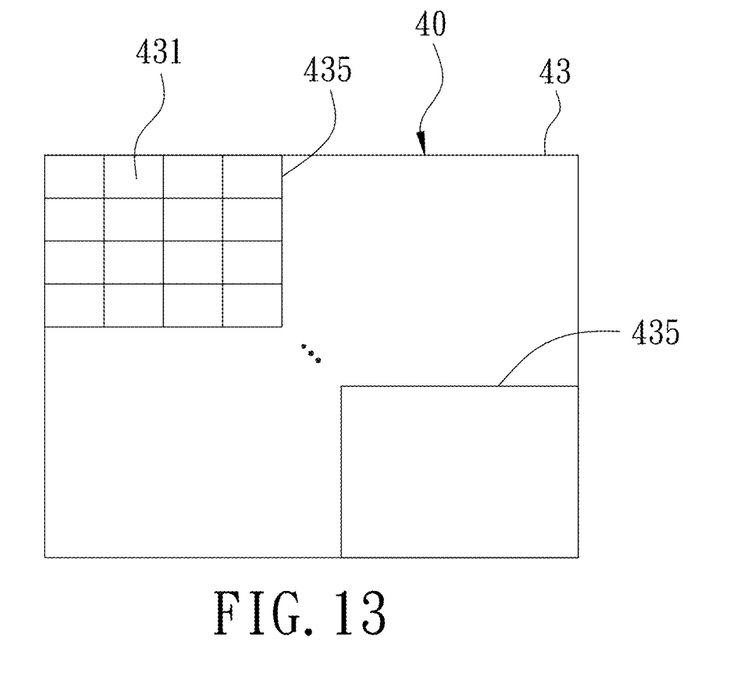
FIG. 13 is a schematic view of the two-dimensional RGB pixel layer corresponding to the data layer of the point cloud data according to a second embodiment of the present invention when in use.
Figure 14:
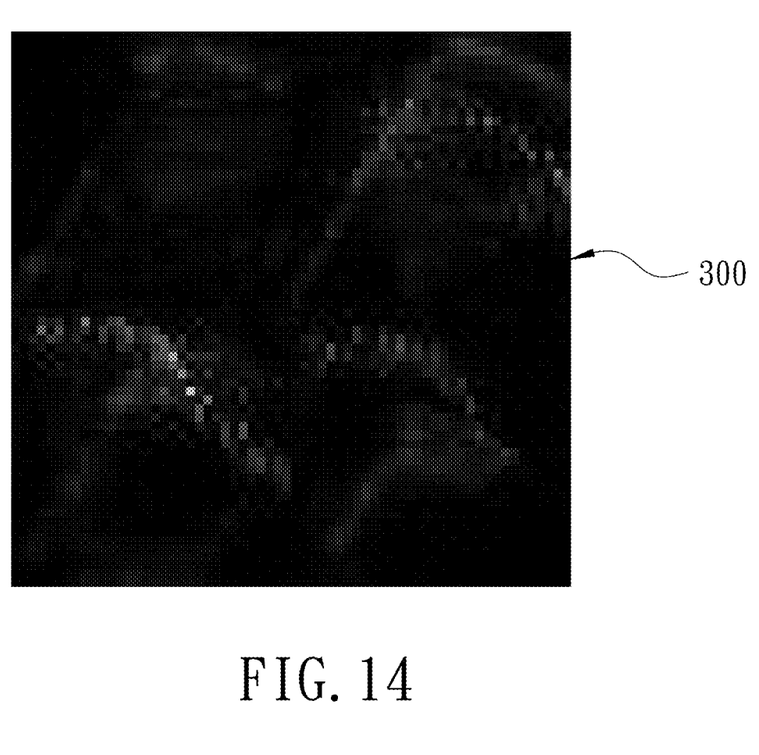
FIG. 14 is a schematic view of generating the two-dimensional RGB color image in the two-dimensional image generation step according to the second embodiment of the present invention when in use.

FIG. 13 and FIG. 14 are schematic views of the second embodiment of the present invention to show the status of the second embodiment of the present invention. The two-dimensional pixel layer 40 is a two-dimensional RGB pixel layer 43. The pixels 431 of the two-dimensional RGB pixel layer 43 are RGB pixels. The pixels 431 of the two-dimensional RGB pixel layer 43 each have an R value, a G value, and a B value. The two-dimensional RGB pixel layer 43 has a plurality of RGB pixel areas 435. The RGB pixel areas 435 correspond to the X-axis data layers 24. The pixels 431 and the R values of the pixels 431 of the RGB pixel areas 435 correspond to the grids 24 land the grid values of the X-axis data layers 24. The RGB pixel areas 435 correspond to the Y-axis data layers 25. The pixels 431 and the G values of the pixels 431 of the RGB pixel areas 435 correspond to the grids 251 and the grid values of the Y-axis data layers 25. The RGB pixel areas 435 correspond to the Z-axis data layers 26. The pixels 431 and the B values of the pixels 431 of the RGB pixel areas 435 correspond to the grids 261 and the grid values of the Z-axis data layers 26. The pixels 431, R values, G values and B values of the RGB pixel areas 435 of the two-dimensional RGB pixel layer 43 correspond to the grids 231 and the grid values of the X-axis data layer 24, the Y-axis data layer 25 and the Z-axis data layer 26, thereby enabling the two-dimensional RGB pixel layer 43 to generate a two-dimensional RGB color image 300. As shown in FIG. 14, the two-dimensional RGB pixel layer 43 and the two-dimensional RGB color image 300 correspond to, identify and store the axial depth and information point features of the point cloud data 20 in the three axes for identification by the architecture of the convolutional neural network. The FIG. 14 is in black and white. In fact, the two-dimensional RGB color image 300 can be in color. In addition, when the two-dimensional pixel layer 40 is a two-dimensional RGB pixel layer 43, compared with the two-dimensional grayscale layer 42, the pixels of a single two-dimensional RGB pixel layer 43 can store three values, the number of information point features that can be accommodated is more than three times the pixels of the two-dimensional grayscale layer 42 because the pixels of a single two-dimensional RGB pixel layer 43 have the feature of storing three values.

Figure 15:
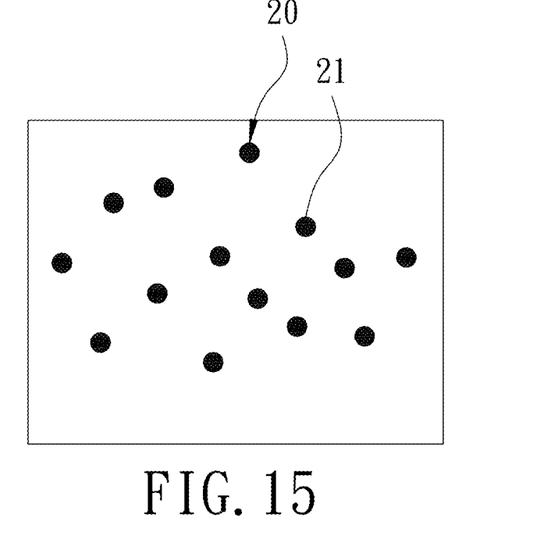
FIG. 15 is a schematic view of the general information points of the point cloud data of the present invention when in use.
Figure 16:
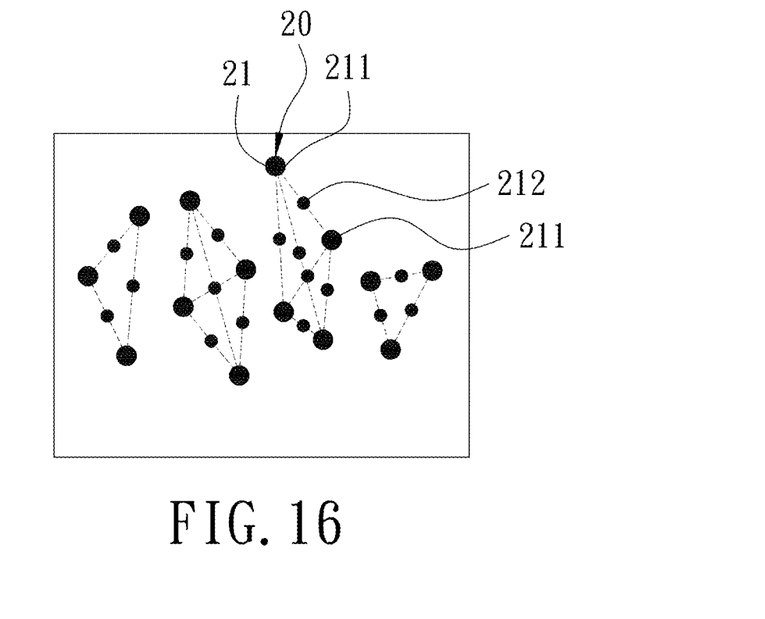
FIG. 16 is a schematic view of the general information points and the supplementary information points of the point cloud data of the present invention when in use.

Please refer to FIG. 15 and FIG. 16 again. FIG. 15 shows that the information points 21 include the general information points 211. The information points 21 of the point cloud data 20 include the general information points 211 and the supplementary information points 212, as shown in FIG. 16. Each supplementary information point 212 is located between every adjacent two of the general information points 211, which can ensure that the additional supplementary information points 212 are within the original general information points 211 and can also prevent the subsequent processing from increasing the processing time due to the excessive number of the information points 21. Furthermore, after the two-dimensional image is input into the architecture of the convolutional neural network for identification, the identification error caused by a small number of the information points 21 can be avoided.

Figure 17:
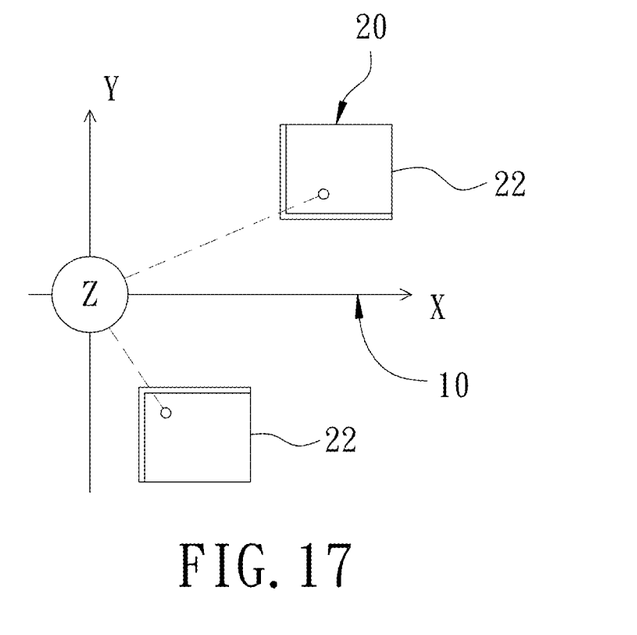
FIG. 17 is a schematic view of the point cloud data without rotation and displacement of the present invention when in use.
Figure 18:
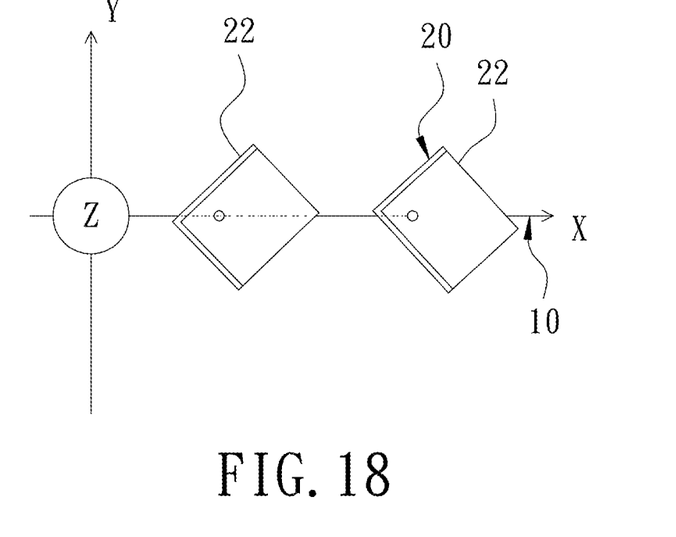
FIG. 18 is a schematic view of the point cloud data that has been rotated and displaced of the present invention when in use.

FIG. 17 and FIG. 18 are schematic views of the present invention when in use. The point cloud data 20 obtained by LiDar is information points on the surface of an object. The information points of the same object may vary depending on the angle of view of the object. Because the information points obtained by LiDar are related to the coordinate of the Lidar at that time, the information points of the object may vary due to the change of the coordinate of the LiDar. For the problem of different angles of view of the object, multiple scans can be performed by rotating the object to construct more complete information points. The difference caused by a different coordinate of the LiDar will cause the direction of the data layer of the point cloud data 20 to be inconsistent. The point cloud data 20 is rotated and displaced at the three-dimensional coordinate 10 to ensure that the data block 22 of the point cloud data 20 has the same coordinate system in the layering step S2.

Figure 19:
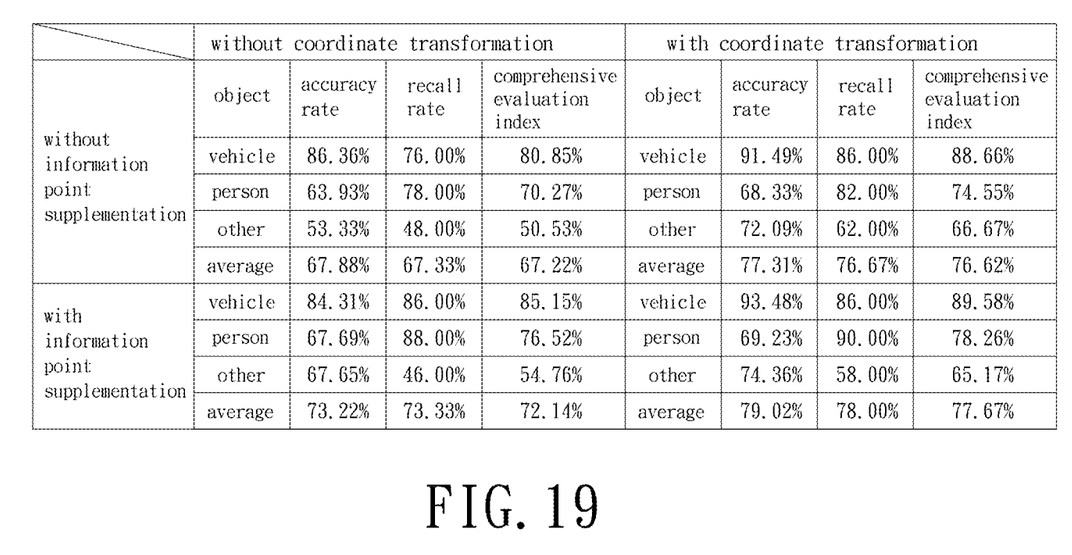
FIG. 19 is a diagram of the recognition result after the two-dimensional grayscale image is input into the architecture of the convolutional neural network when the two-dimensional pixel layer of the present invention is a two-dimensional grayscale layer.

As shown in FIG. 19, when the two-dimensional pixel layer 40 is the two-dimensional grayscale layer 42 and the point cloud data 20 is subjected to coordinate transformation and information point supplementation, the result after the two-dimensional image is input into the architecture of the convolutional neural network for identification shows that the accuracy rate and comprehensive evaluation index are improved after the point cloud data 20 is subjected to coordinate transformation and information point supplementation.

Figure 20:
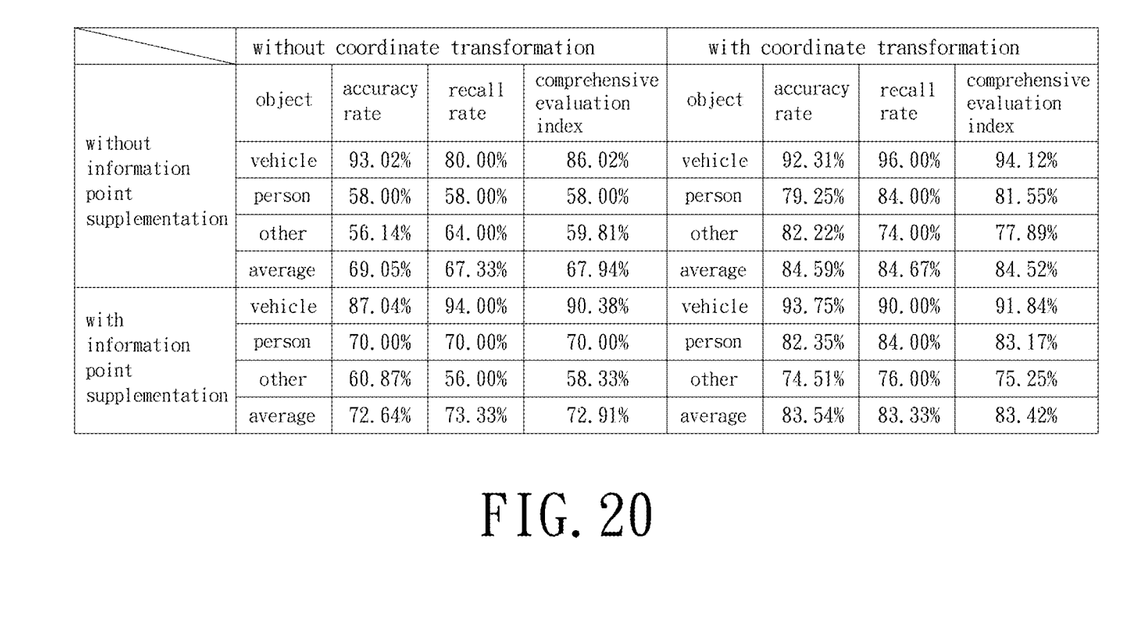
FIG. 20 is a diagram of the recognition result after the two-dimensional RGB color image is input into the architecture of the convolutional neural network when the two-dimensional pixel layer of the present invention is a two-dimensional RGB pixel layer.

As shown in FIG. 20, when the two-dimensional pixel layer 40 is the two-dimensional RGB pixel layer 43 and the point cloud data 20 is subjected to coordinate transformation and information point supplementation, the result after the two-dimensional image is input into the architecture of the convolutional neural network for identification shows that the accuracy rate and comprehensive evaluation index are improved after the point cloud data 20 is subjected to coordinate transformation and information point supplementation.

According to the method for processing the three-dimensional point cloud data 20 of the present invention, through the data creation step S1, the layering step S2, the gridding step S3, the data processing step S4 and the two-dimensional image generation step S5, the three-dimensional point cloud data 20 can be converted into a two-dimensional image to correspond to, identify and store the axial depth and information point features of the point cloud data 20 in the three axes for identification by the architecture of the convolutional neural network.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for processing three-dimensional point cloud data, comprising:
    a data creation step, creating a three-dimensional coordinate and corresponding point cloud data to the three-dimensional coordinate, the three-dimensional coordinate having three axes, the point cloud data having a plurality of information points, the information points including a plurality of general information points, a space where the information points are located forming a data block at the three-dimensional coordinate;
    a layering step, dividing the data block into a plurality of data layers arranged in order along at least one of the axes, through the layering step, axial depths of the point cloud data and the data layers being identifiable; and
    a gridding step, each data layer being gridded into a plurality of grids;
    a data processing step, calculating the number of information points included in each grid and converting the number of information points in each grid into a grid value according to a conversion rule;
    a two-dimensional image generation step, setting a two-dimensional pixel layer, the two-dimensional pixel layer being composed of a plurality of pixels, each pixel having a pixel value, the pixels and the pixel values of the pixels of the two-dimensional pixel layer corresponding to the grids and the grid values of the grids of each data layer of the at least one axis for the two-dimensional pixel layer to generate a two-dimensional image.

2. The method as claimed in claim 1, wherein the three axes are defined as an X-axis, a Y-axis and a Z-axis, the data block is divided into the plurality of data layers along the X-axis, the Y-axis and the Z-axis respectively, the data layers of the data block, divided along the X-axis, are defined as X-axis data layers, the data layers of the data block, divided along the Y-axis, are defined as Y-axis data layers, and the data layers of the data block, divided along the Z-axis, are defined as Z-axis data layers; and the two-dimensional pixel layer and the two-dimensional image is identified by a convolutional neural network.

3. The method as claimed in claim 2, wherein the two-dimensional pixel layer is a two-dimensional grayscale layer, the pixels of the two-dimensional grayscale layer are grayscale pixels, the pixel values of the pixels of the two-dimensional grayscale layer are grayscale values, the two-dimensional grayscale layer is provided with X-axis pixel areas corresponding to the respective X-axis data layers, the pixels and the pixel values of the X-axis pixel areas correspond to the grids and the grid values of the X-axis data layers, the two-dimensional grayscale layer is provided with Y-axis pixel areas corresponding to the respective Y-axis data layers, the pixels and the pixel values of the Y-axis pixel areas correspond to the grids and the grid values of the Y-axis data layers, the two-dimensional grayscale layer is provided with Z-axis pixel areas corresponding to the respective Z-axis data layers, the pixels and the pixel values of the Z-axis pixel areas correspond to the grids and the grid values of the Z-axis data layers.

4. The method as claimed in claim 2, wherein the two-dimensional pixel layer is a two-dimensional RGB pixel layer, the pixels of the two-dimensional RGB pixel layer are RGB pixels, the pixels of the two-dimensional RGB pixel layer each have an R value, a G value and a B value, the two-dimensional RGB pixel layer has a plurality of RGB pixel areas, the RGB pixel areas correspond to the X-axis data layers, the pixels and the R values of the pixels of the RGB pixel areas correspond to the grids and the grid values of the X-axis data layers, the RGB pixel areas correspond to the Y-axis data layers, the pixels and the G values of the pixels of the RGB pixel areas correspond to the grids and the grid values of the Y-axis data layers, the RGB pixel areas correspond to the Z-axis data layers, the pixels and the B values of the pixels of the RGB pixel areas correspond to the grids and the grid values of the Z-axis data layers.

5. The method as claimed in claim 1, wherein the grid value is in the range of 0 to 255, the conversion rule scales a minimum value to a maximum value of the number of information points in each grid to the grid value in the range of 0 to 255.

6. The method as claimed in claim 5, wherein when the grid value of the grid is calculated, the grid is defined as a target grid, the grid value of the target grid is defined as a target grid value, the data layer where the target grid is located is defined as a target data layer, the conversion rule is represented by the following Mathematical Formula 1, $V_{target}=(N_{target}/N_{max})*255$ . . . Formula (1), wherein $V_{target}$ is the target grid value, and $N_{target}$ is the number of information points of the target grid, and $N_{max}$ is the maximum value of the number of information points in all of the grids of the target data layer, and the target grid value is rounded.

7. The method as claimed in claim 1, wherein the information points further include a plurality of supplementary information points, and each of the supplementary information points is interposed between every adjacent two of the general information points.

8. The method as claimed in claim 1, wherein the point cloud data is rotatable and displaceable at the three-dimensional coordinate.

\* \* \* \* \*